July 21, 1936.  L. A. ELMER ET AL  2,048,497
MOTION PICTURE FILM
Filed July 6, 1934
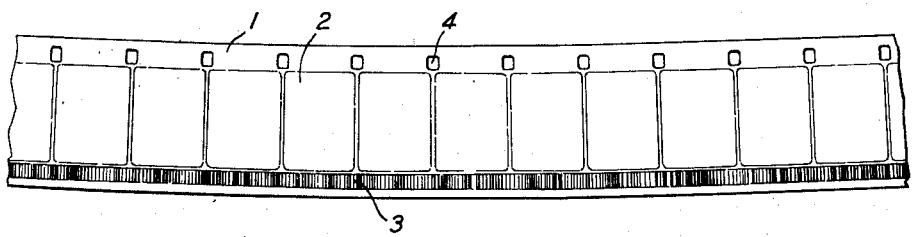
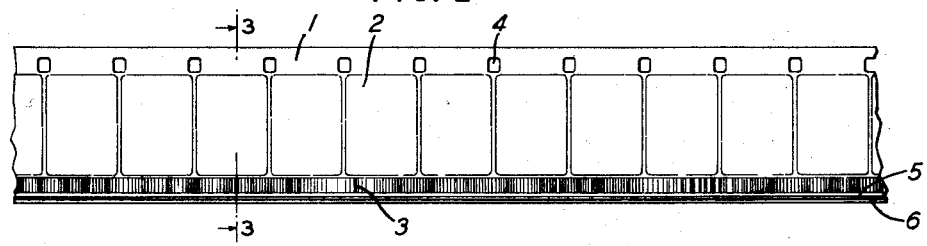
   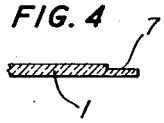
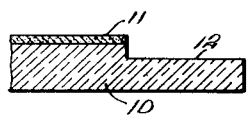
INVENTORS:- L. A. ELMER
T. E. SHEA
BY
G. H. Huydt
ATTORNEY Patented July 21, 1936

2,048,497

UNITED STATES PATENT OFFICE 2,048,497

MOTION PICTURE FILM

Lloyd A. Elmer, West Orange, and Timothy E. Shea, Rutherford, N. J., assignors to Bell Telephone Laboratories, Incorporated, New York, N. Y., a corporation of New York Application July 6, 1934, Serial No. 733,970
In Great Britain April 13, 1934

5 Claims. (Cl. 88—19.5)

This invention relates to motion picture films and more particularly to those having a single row of sprocket tooth perforations located near one edge.

A film with a single row of sprocket tooth perforations has been proposed and is in use to some extent where it is desired to record pictures and the accompanying sound on narrow film stock. The picture and sound records may thus be made larger and occupy space that would be otherwise used for a second row of sprocket tooth perforations.

Difficulty has been experienced with this character of film in that the material of the film tends to warp or shrink unevenly due to its unbalanced condition. The uneven warping of the film is particularly due to evaporation of the film solvent from the exposed edges of the single row of perforations. The warping does not take effect immediately and is not noticeable in a negative film since this film is not ordinarily exposed to the air for any length of time. In positive film which may be stored for a longer period of time or used frequently and thus exposed to the air, the warping of the film becomes objectionable since satisfactory reproduction from this film is difficult.

In accordance with the invention, the above difficulty is overcome by chamfering or otherwise removing or exposing sufficient film stock near the edge which is not provided with sprocket tooth perforations to counteract the effect of the film stock exposed by the edges of the perforations.

One embodiment of the invention contemplates a method of reducing the warping by providing longitudinal grooves in the film stock in the narrow free space provided between the sound record and the edge of the film. This space may, however, be chamfered or otherwise cut in any manner to balance the effect of the removal of film stock in making the perforations and the exposure of the perforation edges to the atmosphere.

The invention is diagrammatically illustrated in the accompanying drawing in which:

Fig. 1 shows a portion of a sound picture film having a single row of perforations which has become warped due to uneven evaporation;

Fig. 2 shows an enlarged scale of a portion of a sound picture film provided with grooves in accordance with the invention; and Figs. 3, 4 and 5 are enlarged cross-sectional views of the film showing alternative methods of carrying the invention into effect.

Fig. 6 is an enlarged cross-section of the film showing part of the emulsion and film base removed.

Referring to Fig. 1 of the drawing, the film 1 is provided with pictures 2, a sound record 3 adjacent one edge and sprocket tooth perforations 4 adjacent the other edge. This view illustrates the tendency of the film to become warped due to the non-symmetrical location of the sprocket tooth perforations. The narrow film is ordinarily made with an acetate base only and hence the distortion from drying and atmospheric changes is greater than with the nitrate base film. The curve of the film shown in Fig. 1 was taken from an acetate base film with a single row of perforations which had been allowed to stand in the air for about twelve days. These are approximately the conditions which will prevail with positive film which is stored and used frequently for its useful life. This film is difficult to drive smoothly through sound reproducing apparatus because of its tendency to bear against the corners of the sprocket teeth, thus producing velocity variations and sound distortion during reproduction.

One method of carrying the invention into effect to correct the warping tendency of the film as shown in Figs. 2 and 3 is to provide one or more grooves, such as 5 and 6, in the narrow space between the sound record 3 and the adjacent edge of the film. One groove is shown approximately two and one-half thousandths of an inch deep and the second groove approximately one and one-half thousandths of an inch deep. These dimensions are, however, given only as a matter of illustration. These grooves are provided in a portion of the film which is otherwise not used and do not interfere with the reproduction of the sound and pictures. These grooves may be made in any manner and are not limited to sharp cornered grooves as illustrated.

It should be noted that the warping effect for which this invention provides compensation is caused by drying out of the solvent from the film base. The photographic emulsion over the film base is microscopically thin and its effect on warping is negligible. As a result, it is immaterial whether the compensating grooves or exposing areas are cut on the emulsion side or on the reverse side of the film.

The compensating area exposed in a given length of film will be approximately equal to the aggregate area of surface exposed by the sprocket holes in the same length of film. This relation is, however, not an exact one as the proximity of the groove to the edge will have an effect, and further the compensating effect of the exposed area is continuous whereas that of the sprocket holes is intermittent. The end sought can best be attained when the drying effect due to the artificial exposure is the same as the drying effect due to the sprocket perforations. Obviously, maximum results can be obtained only by experimental determination.

Fig. 4 shows an alternative arrangement in which a portion of the film at the edge has been removed. In this figure the surface of the cut is parallel to the surface of the film.

In Fig. 5 a portion of the film has been removed at 8 to provide a beveled chamfer. The edge of the film may be scalloped or narrow elongated perforations may be provided in the space between the sound track and the edge of the film.

In Fig. 6 a portion of the film base is shown removed on the emulsion side of the film. It is considered preferable to form the compensating groove on the emulsion side of the film, but as previously stated, either side of the film may be used for this purpose.

The invention is particularly suitable for application to narrow width films, for example, 16 millimeter films, in view of the usual practice of providing sprocket tooth perforations adjacent both edges of the wider films. The invention is, however, not limited to any particular width of film and may be applied to films with pictures only or sound track only thereon.

What is claimed is:

1. A method of reducing the warping of a motion picture film having a single row of sprocket tooth perforations adjacent one edge consisting in exposing film base near the other edge of the film to counteract the effect of the removal and exposure of film stock in producing film perforations.

2. A method of reducing the warping of a motion picture film having a single row of sprocket tooth perforations adjacent one edge consisting in cutting into the film base near the other edge to remove and expose substantially the same amount of film base as that which is removed and exposed by the sprocket tooth perforations.

3. A method of reducing the warping of a motion picture film having a single row of sprocket tooth perforations adjacent one edge consisting in chamfering the film base near the other edge of the film to expose substantially the same amount of film base near opposite edges of the film.

4. A method of reducing the warping of a motion picture film having a single row of sprocket tooth perforations adjacent one edge consisting in cutting longitudinal grooves in the film base near the other edge of the film to expose substantially the same amount of film base near opposite edges of the film.

5. A method of reducing the warping of a motion picture film having a single row of sprocket tooth perforations adjacent one edge consisting in exposing sufficient film base to the atmosphere near the other edge of the film to counteract the effect of the film base exposed at the edges of the sprocket tooth perforations.

LLOYD A. ELMER.
TIMOTHY E. SHEA.